US006351261B1

(12) United States Patent
Reichlen et al.

(10) Patent No.: US 6,351,261 B1
(45) Date of Patent: Feb. 26, 2002

(54) SYSTEM AND METHOD FOR A VIRTUAL REALITY SYSTEM HAVING A FRAME BUFFER THAT STORES A PLURALITY OF VIEW POINTS THAT CAN BE SELECTED AND VIEWED BY THE USER

(75) Inventors: Bruce A. Reichlen, Acton, MA (US); Ivan E. Sutherland, Santa Monica, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/114,546

(22) Filed: Aug. 31, 1993

(51) Int. Cl.⁷ .............................................. G06F 17/00
(52) U.S. Cl. ...................................... 345/427; 345/429
(58) Field of Search ...................... 395/127, 161–164, 395/152, 118–119, 129, 135; 345/119, 427, 419, 433, 435, 473, 474, 355, 357; 348/7, 8, 10; 434/43, 40

(56) References Cited

U.S. PATENT DOCUMENTS

| | | | | |
|---|---|---|---|---|
| 4,734,690 A | * | 3/1988 | Waller | 340/729 |
| 4,873,585 A | * | 10/1989 | Blanton et al. | 386/46 |
| 4,928,253 A | * | 5/1990 | Yamauchi et al. | 364/521 |
| 4,980,765 A | * | 12/1990 | Kudo et al. | 358/160 |
| 4,987,554 A | * | 1/1991 | Kaufman | 364/522 |
| 5,081,449 A | | 1/1992 | Kurosu et al. | 340/721 |

(List continued on next page.)

OTHER PUBLICATIONS

Foley, et al, *Computer Graphics*, Addison–Wesley; 1990 Reprint for error Nov. 1992.*

(List continued on next page.)

*Primary Examiner*—Cliff N. Vo
(74) *Attorney, Agent, or Firm*—Blakely Sokoloff Taylor & Zafman

(57) ABSTRACT

A computer video display system and method is disclosed. The computer video display system includes a frame buffer for storing a multiplicity of view points of a model to be displayed, a measurement device for measuring an aspect of the user's movement, a view point device for ascertaining a point of view of the model to be displayed in response to the measurement device, a computational device for modifying the view point according to a predefined algorithm, an access device for accessing the appropriate display information from the frame buffer, and a head mounted display for displaying the selected view point of the model. During operation, the measuring device, the view point device, and the computational device continuously update the view points of the model in response to movements of the user. In response thereto, the access device traverses the frame buffer and provides the updated display information to the head mounted display. The image, as seen through the head mounted display, appears to be continuous, fluid and natural.

29 Claims, 5 Drawing Sheets

U.S. PATENT DOCUMENTS

| | | | |
|---|---|---|---|
| 5,101,475 A | | 3/1992 | Kaufman et al. ............ 395/124 |
| 5,117,468 A | | 5/1992 | Hino et al. .................... 382/41 |
| 5,266,932 A | | 11/1993 | Tokumitsu ................... 345/123 |
| 5,275,565 A | * | 1/1994 | Moncrief ....................... 434/29 |
| 5,276,437 A | * | 1/1994 | Horvath et al. ............. 345/119 |
| 5,287,437 A | * | 2/1994 | Deering ....................... 345/427 |
| 5,300,948 A | | 4/1994 | Isujido et al. ................ 395/166 |
| 5,319,490 A | * | 6/1994 | Ansley ........................ 359/209 |
| 5,343,560 A | | 8/1994 | Takeda et al. .............. 395/166 |
| 5,347,400 A | * | 9/1994 | Hunter ........................ 359/815 |
| 5,361,385 A | | 11/1994 | Bakalash .................... 395/124 |
| 5,373,857 A | | 12/1994 | Travers et al. .............. 128/782 |
| 5,388,192 A | | 2/1995 | Ohsawa et al. ............. 395/135 |
| 5,388,990 A | | 2/1995 | Beckman ..................... 434/38 |
| 5,394,517 A | | 2/1995 | Kalawski .................... 395/129 |
| 5,689,628 A | * | 11/1997 | Robertson ................... 345/427 |
| 5,696,892 A | * | 12/1997 | Redmann et al. ........... 345/425 |
| 5,936,630 A | * | 8/1999 | Oxaal ......................... 438/268 |

OTHER PUBLICATIONS

Deguchi, Koichiro et al, "Integrated Parallel Image Processings on a Pipelined MIMD Multi–Processor System PSM," Pattern Recognition, 1990 10th Intl Conference, pp. 442–444.

Kaba, Jim, "Interactive Terrain Rendering and Volume Visualization on the Princeton Engine," Visualizations, 1992 Conference, pp. 349–355.

Kaufman, Arie et al, "Memory and Processing Architecture of 3D Voxel–Based Imagery," IEEE Computer Graphics and Applications Magazine, pp. 10–23, Nov. 1988.

Nishimura, Satoshi et al, "A Loosely–Coupled Parallel Graphics Architecture Based on a Conflict–Free Multiport Frame Buffer," Future Trends of Distributed Computing Systems, 1991 Workshop, pp. 411–418.

"A Head–Mounted Three Dimensional Display" by Ivan E. Sutherland, 1968, pp. 757–764.

* cited by examiner

SYSTEM AND METHOD FOR A VIRTUAL REALITY SYSTEM HAVING A FRAME BUFFER THAT STORES A PLURALITY OF VIEW POINTS THAT CAN BE SELECTED AND VIEWED BY THE USER

BACKGROUND OF THE INVENTION

1. Field of he Invention

The present invention relates to computer graphics, and, more particularly, to a system and method to substantially increase the capability of a computer to present information.

2. Background of the Invention

Computers have vastly increased their ability to process information. Many computers now include one or more powerful microprocessors. Multi-tasking operating systems have given the computer the ability to execute more than one application at a time. Application programs have taken advantage of this increased computing power, and as a result, have become more graphic intensive.

The size of standard computer terminals (e.g., a 19 inch monitor) has become a limiting factor in presenting processed information to the user. A standard desktop computer now has the capability to inundate the display terminal of the computer with information. The computer industry has attempted several approaches to overcome this problem.

The most common approach has been window based software. Windowing systems attempt to maximize the use of the screen space of a display terminal by providing overlapping windows and icons. The window operating environment, although useful, is often frustrating to operate. The user is required to spend an inordinate amount of time moving, resizing, and opening and closing various windows and icons on the display space. The opening and closing of a window is often slow. Over-lapping windows can be aggravating to the eye. It is also difficult to manipulate information within windows. The physical size of the display terminal limits the size of each window, the number of windows that can be displayed at a given time, and in the case of graphic intensive applications, is often too small to display an image of an object in its entirety.

Another approach to increase the display surface area of a computer is to simply use a larger monitor. Several companies are marketing twenty-eight (28) inch diagonal monitors. These extra-large monitors do increase the display capabilities of the computer to some degree, but the problems outlined above are still present. These monitors are also prohibitively expensive to build and difficult to ship to customers. One such monitor currently on the market weighs over two hundred pounds and is more than thirty inches deep. This monitor is clearly impractical for standard desktop computers.

Virtual reality systems represent yet another approach to increasing the display area of a computer. It is believed a virtual reality system was first described by Ivan Sutherland, a co-inventor of the present application, in a seminal article entitled "A head-mounted three dimensional display", AFIPS Conference Proceedings, Volume 33, 1968. This article describes an imaging pipeline, including: a database for storing all the data, relationships and objects that are relevant to a model to be displayed; a position sensor for selecting a view point of the model to be displayed; a transformer for traversing the database, extracting the appropriate data to generate the model from the selected view point, and transforming it on the fly to a display format; a frame buffer for storing the transformed data; and the head mounted display for displaying the data stored in the frame buffer. The virtual reality system thus provides the user with a head-motion parallax: when the user moves his head, the view seen through the head mounted display unit changes as it would in real life.

It is believed that all current virtual reality systems, which use the basic pipeline described above, are limited in their performance. Only the current image, as seen in the head mounted display at a given time, is stored in the frame buffer of the system. When the user moves his head, a new scene must be calculated on the fly by the computer and stored in the frame buffer of the system. This causes a perceptible lag time between the selection of a new view point and the time the new image appears on the head mounted display. This lag is unnatural and uncomfortable to the user. Prolonged use of these virtual reality systems has been known to cause nausea.

SUMMARY OF THE INVENTION

The present invention is a system and method for a computer video display. The present invention provides an inexpensive, easy-to-use large display environment.

The computer video display system includes a frame buffer for storing a multiplicity of view points of a model to be displayed, a measurement device for ascertaining a point of view of the model to be displayed in response to the measurement of an aspect of the user's movement, a computational device for modifying the view point according to a predefined algorithm, an access device for accessing the appropriate display information from the frame buffer, and a head mounted display for displaying the selected view point of the model. During operation, the measuring device, the view point device, and the computational device continuously update the view points of the model in response to movements of the user. In response thereto, the access device traverses the frame buffer and provides the updated display information to the head mounted display.

The display information is presented to the user in a view window in the head mounted display. To generate the view window, the computational device and the access device generate a plurality of scan lines from the frame buffer. The scan lines contain pixel information corresponding to the current point of view of the model to be displayed in the view window. For each view window in the preferred embodiment, nine hundred (900) scan lines are generated in the vertical direction, and each scan line is eleven hundred and twenty (1120) bits long in the horizontal direction.

In a preferred embodiment, the computer video display system provides a virtual view space which is in the shape of a 360° cylinder and a height of 135° surrounding the computer user. The virtual view space is mapped into the frame buffer in the computer system. As the user scans the virtual view space, the frame buffer is immediately traversed, and the view window as seen through the head mounted display is updated. As a result, the image, as seen through the head mounted display, appears to be continuous, fluid and natural.

The computer video display of the present invention provides a number of unique features and advantages. The user is immersed in a virtual view system, which provides the user with an almost inexhaustible image space. The user navigates the virtual view space in a natural manner by simply adjusting the measurement device. The frame buffer contains all the view points of the model to be displayed. The data, relationships and objects that are relevant to the points of view are stored in the frame buffer in the transformed state. This eliminates the need to calculate display information on the fly, store it in a frame buffer, and then display it, as is required in prior art virtual reality systems. Display information is retrieved from the frame buffer and displayed, virtually eliminating any perceptible lag time.

DESCRIPTION OF THE DRAWINGS

The objects, features and advantages of the system and method of the present invention will be apparent from the following description in which.

DESCRIPTION OF THE PREFERRED EMBODIMENT

Figure 1:
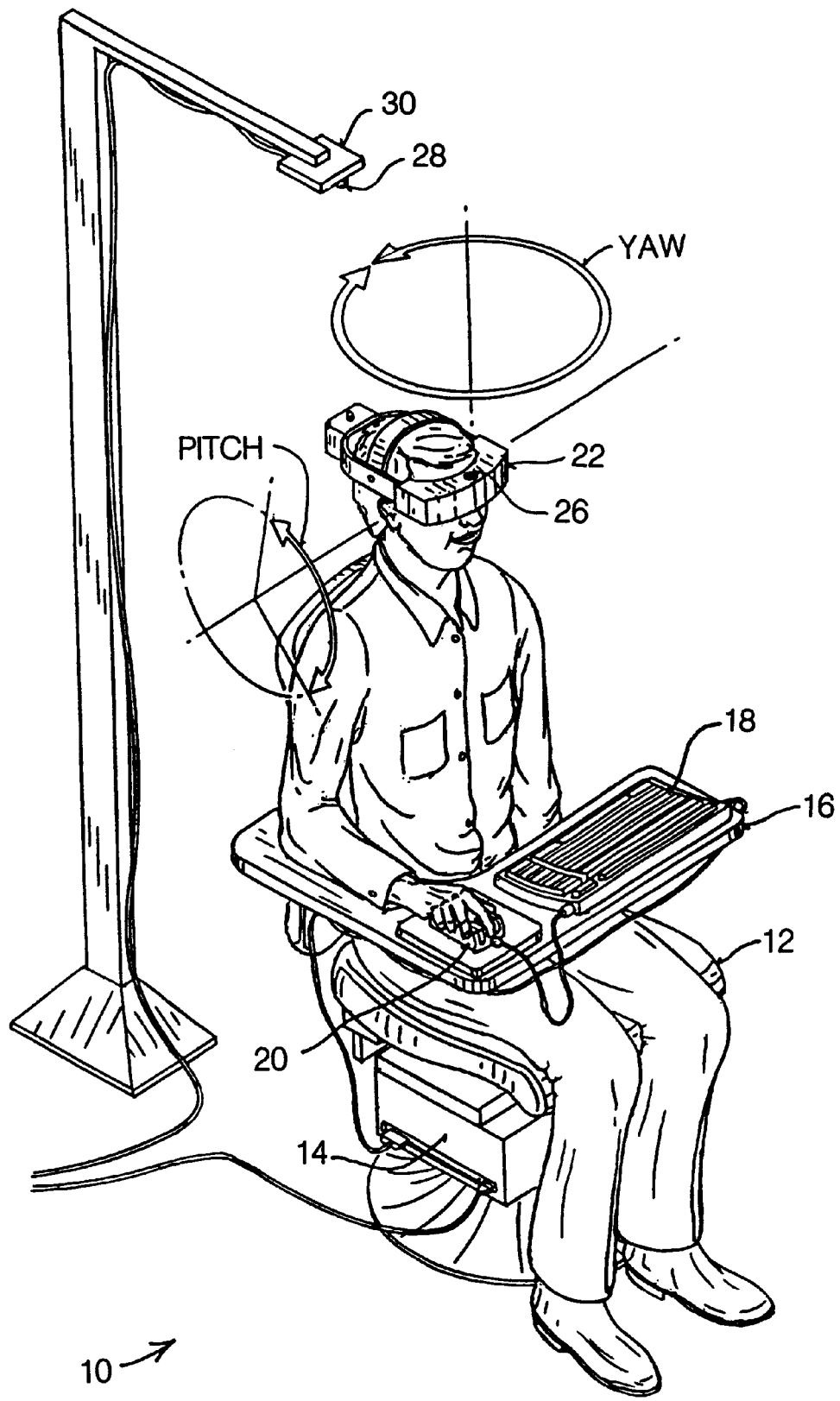
FIG. 1 illustrates a computer operator using the video display system of the present invention.

Referring to FIG. 1, a computer operator using the video display system of the present invention is shown. The video display system 10 includes a swivelling chair 12, a computer 14 mounted at the base of the chair 12, a platform 16 for supporting computer peripheral devices such as a keyboard 18 and a mouse 20, a head mounted display 22 and a position sensor 24 (housed inside computer 14), including a transmitter 26 mechanically coupled to the head mounted display 22 and a receiver 28 mechanically connected to a stationary reference point 30. The reference point can be located above the user's head as illustrated in FIG. 1, at the base of the chair 12, or any other stationary location in the vicinity of the video display system 10.

Figure 2:
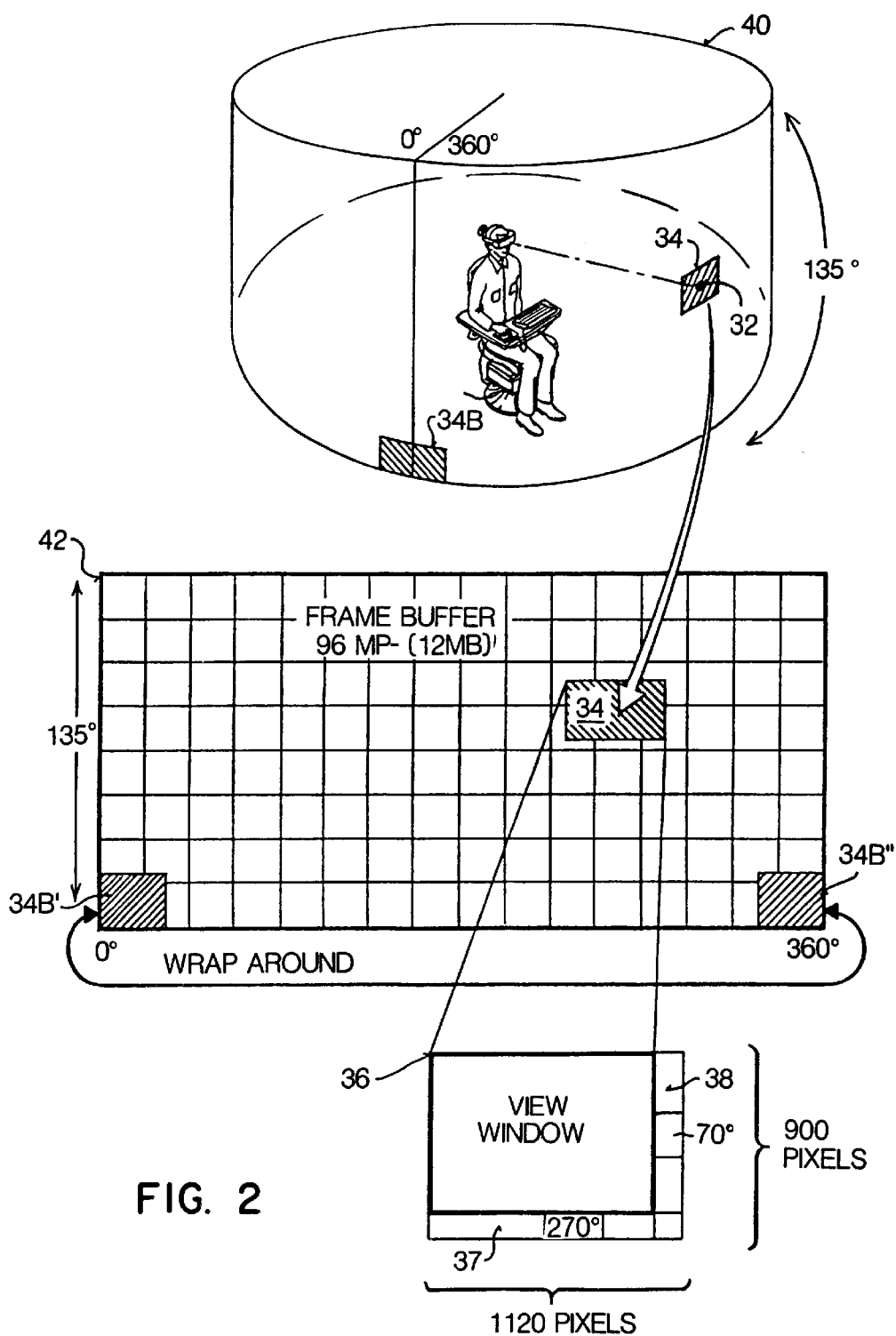
FIG. 2 illustrates the relationship between a frame buffer, a view port, a view window and a virtual view space of the video display system of the present invention.

Referring to FIG. 2, the relationship between a frame buffer, a view port and a view window in a virtual view space in the video system 10 is illustrated. The virtual view space 40 is the total image area in the video display system 10. The virtual view space 40 is 360° and has a height of 135°. The virtual view space 40 is shaped like a "cylinder" which surrounds the user. In the preferred embodiment, the total size of the virtual view space 40 is equivalent to a wall size display having the dimensions of approximately eight (8) feet by three (3) feet.

The virtual view space 40 includes ninety-six (96) million discrete points, each identified by a particular yaw and pitch location. In the horizontal direction, there are sixteen thousand (16K) discrete yaw locations. In the vertical direction, there are six thousand (6K) discrete locations.

The frame buffer 42, contained in the memory of computer 14, includes twelve (12) megabytes (MBs) of dynamic random access memory (DRAM) and has a storage capacity of ninety-six million memory locations. Each memory location stores pixel information. The memory locations in the frame buffer 42 are organized into words. Each word is thirty-two (32) bits long.

The virtual view space 40 is "mapped" into the frame buffer 42. For each (yaw, pitch) location in the virtual view space 40, an addressable memory location is provided in the frame buffer 42. The memory locations store the pixel information for the corresponding (yaw, pitch) location in the virtual view space 40 respectively.

The left-most edge of the frame buffer 42 corresponds to the 0° location in the virtual view space 40. The right-most edge of the frame buffer 42 corresponds to the 360° location in the virtual view space 40. The bottom edge of the frame buffer 42 corresponds to the 0° location of the virtual view space 40 and the top edge of the frame buffer corresponds to the 135° location of the virtual view space 40 in the vertical direction.

During operation, the user may navigate the virtual view space 40 by rotating his head from side to side, tilting his head up or down, or swivelling in chair 12. The position sensor 24 permits the video display system 10 to emulate a video environment that has two degrees of freedom. The position sensor 24 generates rotation (yaw) information and vertical movement (pitch) information in response to the movement of the transmitter 26 on the head mounted display 22 with respect to the receiver 28 at the reference point 30. It should be noted that in the preferred embodiment, only yaw and pitch movement is measured. It is within the scope of the present invention to measure other motions, such as scaling (forward/backward), roll, lateral, side-to-side, and up/down.

When the user looks at a discrete point in the virtual view space 40 with the head mounted display 22, the computer 14 calculates a view point 32 in the virtual view space 40 from the yaw and pitch information from the position sensor 24. The computer 14 then defines a view port 34 around the view point 32 in the virtual view space 40. The view point 32 is located in the center of the view port 34, equidistant from the vertical and horizontal boundaries of the view port 34. The view port 34 has the dimensions of (25°×20°) within the virtual view space 40.

To generate an image of the view port 34 in the virtual view space 40, computer 14 retrieves the pixel information from the frame buffer 42 that corresponds to the view port 34. The pixel information is stored in (1120×900) memory locations. The pixel information is subsequently transferred to the head mounted display 22. The pixel information displayed in the head mounted display 22 is referred to as view window 36. The view window 36 includes (1120×900) pixels and has the dimensions of (25°×20°) within the virtual view space 40.

The view window 36 may include a horizontal scroll bar 37 which designates the yaw position and a vertical scroll bar 38 which designates the pitch position of the view window 36. In the example illustrated in FIG. 2, the display window 36 is located at a position of approximately 270° yaw and 70° pitch in the virtual view space 40. The scroll bars help the user keep track of the current location in the virtual view space 40 and they help to locate regions in the virtual view space 40 not currently displayed in the view window 36.

The virtual view space also includes a wrap around feature. For example, if a view port 34B overlaps the (0°/360°) intersection of the virtual view space 40, memory locations from both the left side 34B' and right side 34B" of the frame buffer 42 are accessed. The pixel information contained in regions 34B' and 34B" is used to define the view port 34B, and are subsequently displayed in the head mounted display 22. The virtual view space 40 thus appears "seamless" to the user.

In summary, the virtual video system 10 of the present invention provides an image pipeline. For each yaw and pitch sample, the computer 14 determines the view point 32, and the view port 34. The pixel information contained in the view port 34 is retrieved and displayed on the head mounted display 22 as a view window 36 of the virtual view space 40.

As the user moves his head through the virtual view space 40, the frame buffer 42 is immediately traversed. As a result, the view window 36 in the head mounted display 22 is continuously updated. The image appears to be fluid and natural. The problems related to lag in prior art virtual reality systems are thus effectively eliminated.

THE VIDEO DISPLAY SYSTEM

Figure 3:
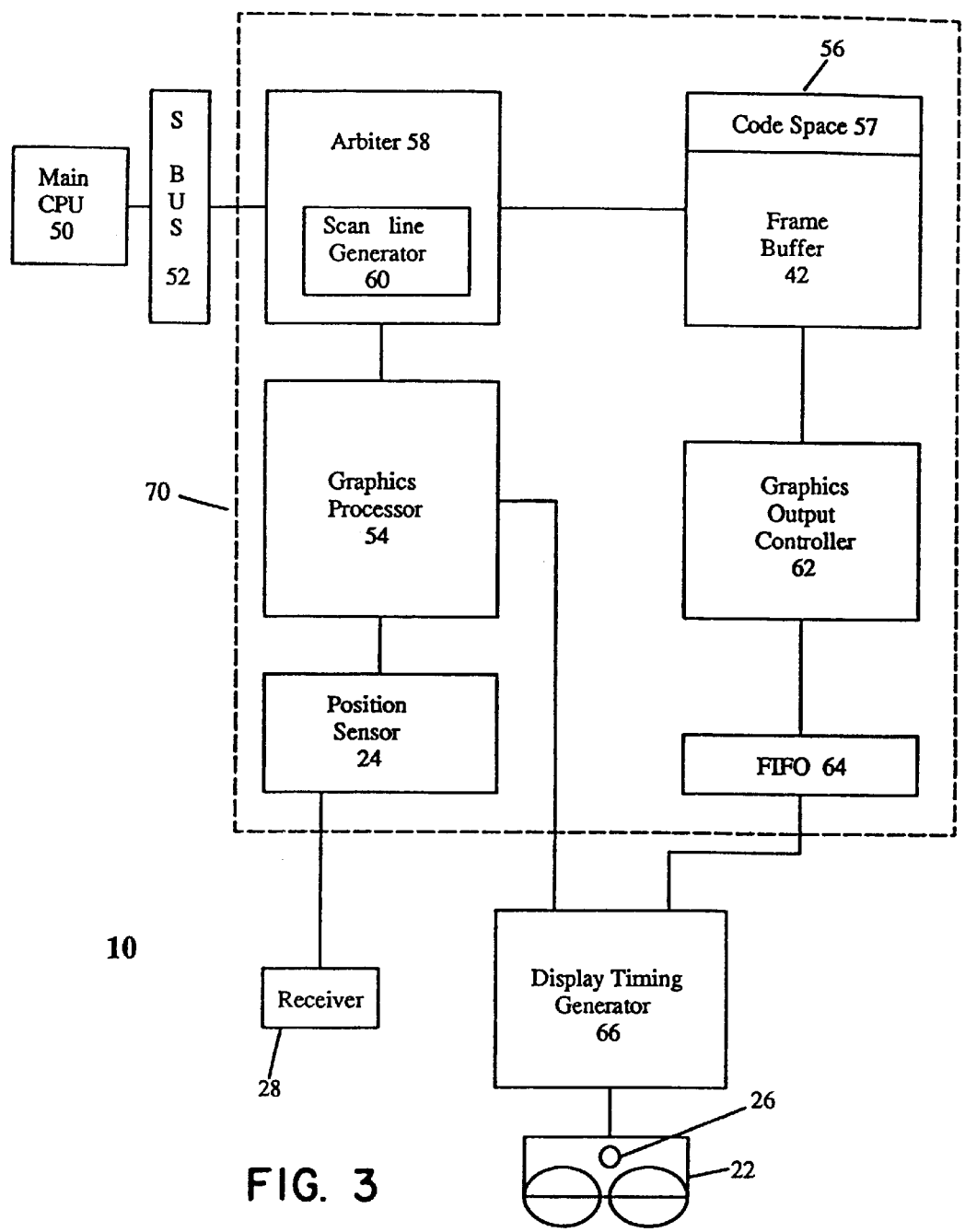
FIG. 3 illustrates a block diagram of the video display system of the present invention.

Referring to FIG. 3, a block diagram of the video display system 10 is shown. The video display system 10 includes a main CPU 50, a system bus (SBus) 52, a graphics processor 54, a memory 56 including the frame buffer 42 and code space 57, an arbiter 58, a scan line generator 60, graphics output controller 62, first-in-first-out (FIFO) buffer 64, display timing generator 66, the position sensor 24 and the head mounted display 22.

The graphics processor 54, memory 56, arbiter 58, scan line generator 60, graphics output controller 62, FIFO 64 are all provided on a single bufferdisplay card 70. The display timing generator 66 is an electronic card marketed by Reflection Technology along with the head mounted display 22. A ribbon cable (not shown) is used to couple the display buffer card 70 and the display timing generator card 66. The two cards are inserted in the housing of computer 14. The position sensor 24 is wired to the buffer display card 70 through the RS-232 port (not shown) of the computer 14.

THE COMPUTER SYSTEM AND MAIN CPU

The computer 14 can be any general purpose computer platform, such as a SPARCstation 2 or a SPARCstation 10 marketed by Sun Microsystems, Inc., of Mountain View, Calif., assignee of the present invention. These computers run a multi-tasking operating system called Sun OS and use a window manager system called Open Windows.

The primary responsibility of the main CPU 50 with respect to the video display system 10 is to fill the frame buffer 42 with information to be displayed in the virtual view space 40. This information is placed on the SBus 52 by the main CPU 50, and, under the discretion of the arbiter 58, is subsequently stored in the frame buffer 42. The manner in which the main CPU places information on the SBus 52 is well known, and therefore is not described in detail.

The main CPU 50 uses a modified version of Open Windows. The modified version of Open Windows retains the ability to move windows, resize windows, open and close windows, pull down menus, user interface, etc., within the virtual view space 40. Since the virtual view space 40 is several orders of magnitude larger than a traditional monitor screen, problems related to allocating screen space and preventing programs from interfering with one another are virtually eliminated. The modified Open Windows, however, retains these features in the event they are needed.

Modifications to Open Windows were made to take advantage of and to extend the user interface capabilities of the virtual view system 10 environment. These modifications predominantly include changes to the window manager of Open Windows. For example, when the user opens a new window, the window manager ensures that the window is displayed in the current view window 36. Similarly, the window manager is modified so that dialog boxes appear in the current view window 36. When the user invokes a full screen or a full height function of an image, the window manager has been modified so that the image is resized to match that of the view window 36, and not the size of the frame buffer. The window manager is also modified to account for the fact that the cursor is primarily controlled by the position sensor 24. The window manager insures that the cursor always appears in the current view window 36. The mouse 20 only secondarily controls the cursor by determining its position within the current view window 36. Many of these modifications are desirable because the frame buffer 42 is much larger than the view window 36, which differs from than prior art video systems where the frame buffer and the display are the same size.

In an office environment, for example, the user may be running a word processing program, a calender management program, and a computer automated drawing (CAD) drawing program on the main CPU 50. The information generated by these three programs can be displayed, at the user's discretion, anywhere in the eight by three foot (8'×3') virtual view space 40. For example, when the user opens a window at a particular area in the virtual view space 40, the main CPU 50 is responsible for allocating the corresponding memory locations in the frame buffer 42. The proper image is presented in the head mounted display 22 when the user looks at a particular location in the virtual view space 40.

VIDEO DISPLAY HARDWARE

The graphics processor 54 can be any general purpose processor. In one embodiment of the present invention, a Fujitsu 40 Mhz SPARClite™ microprocessor is used. The graphics processor 54 is responsible for determining the view points 32 and view ports 34 in response to the yaw and pitch samples respectively from the position sensor 24. The graphics processor 54 may also use prediction algorithms to predict the movement of the head mounted display 22. These algorithms include a smoothing function which reduces the effects of instability in the movement of the user's head. A "stick" function determines how the video display system 10 is to respond when the user begins to move his head. Since a user will not keep his head perfectly still while looking at a view window 36, the stick function will freeze the view window. When a movement threshold is exceeded, the graphics processor 54 "unsticks" the image in the view window 36 and the image can be updated. Such algorithms are well known and are often referred to as "hysterysis" algorithms. The graphics processor 54 is also responsible for calculating and displaying the scroll bars 37 and 38 in the view window 36.

The memory 56 includes sixteen megabytes (16 MB) of DRAM. Four megabytes (4 MBs) are dedicated for code space 57 for the graphics processor 54. The code for the standard graphics algorithms is stored in this memory space. The remainder of the memory 56 is used for the frame buffer 42, as described above. In one embodiment, the memory includes thirty-two 4 MBit DRAM chips.

The arbiter 58 is an application specific integrated circuit (ASIC) chip designed for the video display system 10. The scan line generator 52, the graphics processor 54, and the main CPU 62 all compete for access to the frame buffer 42. The arbiter 58 controls access to the frame buffer 42 according to a basic priority protocol. The scan line generator 60, the graphics processor 54, and the main CPU 50 have first, second and third priority rights to the frame buffer 42 respectively. A state machine is used to select one of the three inputs in accordance with the above-defined protocol. The arbiter 58 is also responsible for generating the row address signals (RAS) and column address signals (CAS) for accessing the frame buffer 42 for refreshing the DRAM memory of the frame buffer 42, and other memory related functions. Since bus arbitration and these other memory related functions are well known in the art, a detail description is not provided herein.

The scan line generator 60 is a part of the arbiter 58. A scan line is defined as thirty-six consecutive words (1152 bits) in the frame buffer 42. The scan line generator 60, under the direction of the graphics processor 54, is responsible for addressing the words in the frame buffer 42 which define a scan line. Nine hundred (900) scan lines are used to generate a single view window 36.

The graphics output controller 62 is a shift register capable of holding one scan line and is responsible for truncating the scan line to (1120) bits. The truncation eliminates the bits of the scan line that fall outside the boundaries of the view port 34. The truncated scan line is then segmented into bytes (8 bits). The bytes are stored in the FIFO 64.

The display timing generator 66 performs two functions. First, it provides the bytes stored in the FIFO 64 to the head mounted display 22 for display. Second, it generates a new window interrupt and scan line interrupt. These two interrupts are used to control the timing of the graphics processor 54.

The head mounted display 22 provides a (1120×900) monochrome pixel image, corresponding to the 1120×900 pixels of the view window 36 respectively. The view window 36 as seen in the mounted display 22 extends (25°× 20°). The head mounted display 22 provides a very clear, crisp image having a resolution that exceeds a conventional computer monitor. A display device, such as the Private Eye™, designed by Reflection Technology of Waltham, Mass., is a suitable choice for the head mount display 22. Although the pixel density of the Private Eye is not quite as high as that mentioned above, the device could be readily modified to provide the preferred pixel density as mentioned above.

In a preferred embodiment, a "6D Tracking System" by Logitech, Fremont, Calif., is used for the position Sensor 24. This device was selected because it is commercially available, is relatively inexpensive, accurate and provides an adequate yaw and pitch sampling rate.

OPERATION

Figure 4:
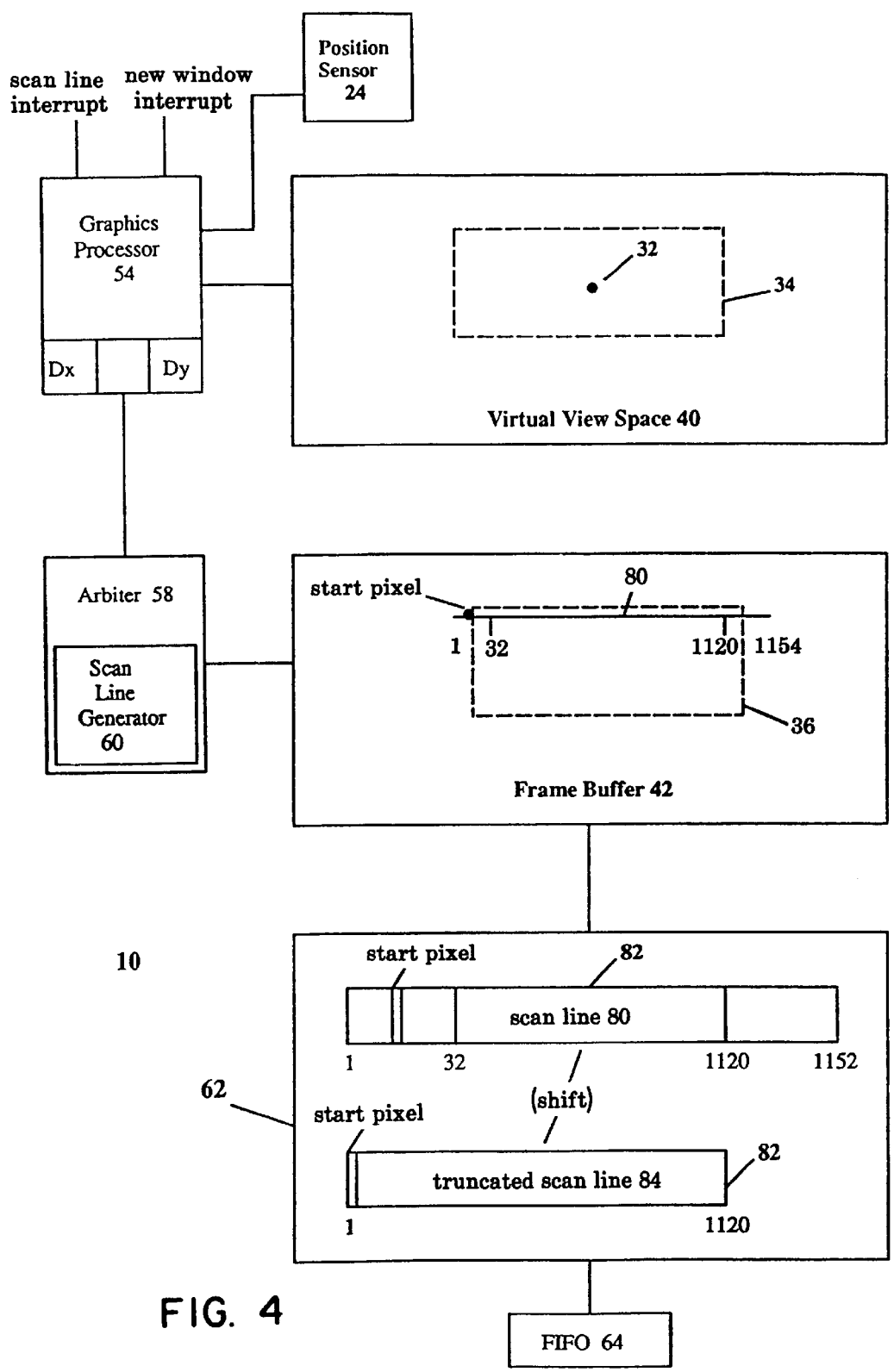
FIG. 4 illustrates the video display system generating a view window according to the present invention.

FIG. 4 illustrates the video display system 10 generating a view window 36 according to the present invention. When the graphics processor 54 receives a new window interrupt from the display timing generator 66, the processor first determines the location of the view point 32 based on the most recent yaw and pitch sample. Next, the graphics processor 54 determines the view port 34 around the view point 32. The view point 32 and the view port 34 are shown superimposed on the virtual view space 40. (Note the size of the view port 34 in reference to the virtual view space 40 is not to scale.)

The display timing generator 66 then generates a scan line interrupt. In response to this interrupt, the graphic processor 54 determines a "start pixel" location for the first scan line 80. The physical memory address for the start pixel location is stored in Dx and Dy registers of the graphics processor 54 respectively.

The scan line generator 60 reads the start pixel address information from the Dx and Dy registers of the graphics processor 54 and determines the physical address of the word that contains the start pixel in the frame buffer 42. The scan line generator 60 then accesses thirty-six consecutive words, in nine bursts of four words, starting with the word that contains the start pixel. The thirty-six words define the scan line 80 which is 1152 bits long. For the scan line 80 illustrated in the figure, the first word is designated by bits (1–32) and the last word is designated by bits (1120–1152). Note that the left side of the view window 36, which is superimposed on the frame buffer 42, coincides with the start pixel location. The right side view window 36 passes through the last word of the scan line 80.

In situations where the wrap around feature is invoked, the scan line generator 60, under the direction of the graphics processor 54 will again access thirty-six words. However, a first subset of the thirty-six words are accessed from the right side of the frame buffer 42 and the remaining words are accessed from the left side of the frame buffer 42.

The graphics output controller 62 receives the scan line 80 from the frame buffer 42 and places its bits into a shift register system 82. This system functions as if it were a 1152 bit wide shift register, which shifts the 1152 bits so that the start pixel is in the left-most position in the register (i.e., position 1). Accordingly, the bits in the first 1120 locations of the register 82 are used to define a truncated scan line 84. Any bits remaining in locations 1021 through 1052 are discarded. The truncated scan line is then divided into 8 bit bytes and stored in FIFO 64.

In the preferred embodiment, the size of the actual shift register is (36) bits wide. For each of the thirty-six words that make up a scan line 80, the graphics processor 54 controls the shift amount by calculating the two's complement of the lower five bits of the start pixel address. This calculation determines the offset of the start pixel within the scan line 80 and shifts the word in the register accordingly. This shift sequence is repeated for the thirty-six words that make up the scan line 80.

The truncated scan lines 84 are stored in byte segments in the FIFO 64 and are sequentially provided to the head mounted display 22 through the display timing generator 66. The head mounted display 22 displays the nine hundred scan lines, from top to bottom, for each view window 36. In this manner, the view window 36 is generated and displayed in a "raster" like fashion in the head mounted display 22.

In a preferred embodiment, the actual lag time of the video display system 10 is approximately 0.033 seconds, which is imperceptible to the human eye. To achieve this lag time, the yaw and pitch information is sampled 30 times a second. The new window interrupt occurs 50 times a second, and the scan line interrupt occurs 45,000 times a second.

VIDEO PIPELINE

Figure 5:
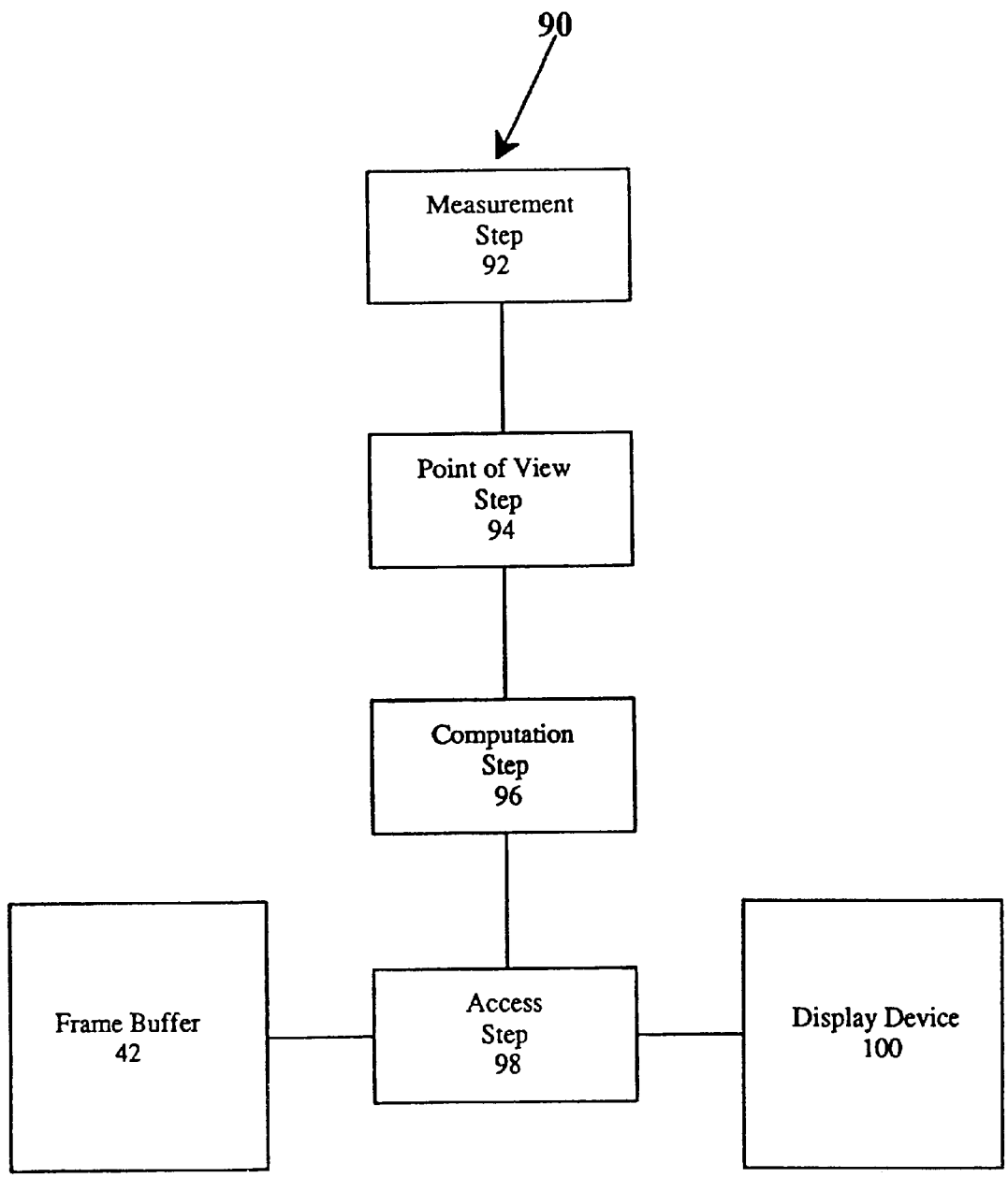
FIG. 5 illustrates a video display system pipeline according to the present invention.

Referring to FIG. 5, a video pipeline according to the present invention is shown. The video pipeline 90 illustrates the functional steps by which the present invention generates a model to be displayed. This figure and the discussion below highlights the advantages and distinctions of the video display system 10 over prior art virtual reality systems.

The video display pipeline includes a measuring step 92 for measuring the user's movement, a step 94 for defining the view point of the model to be displayed based on input from the measuring step 92, a computation step 96 for modifying the point of view based on a predefined algorithm, and an access step 98 for accessing the appropriate data from the frame buffer 42, and providing the data to a display device 100.

The frame buffer 42 stores all of the possible views of the model to be displayed. The data, relationships and objects that are relevant to all possible view points of the model are stored in the converted state (i.e., ready for display) in the frame buffer. This approach significantly differs from the prior art virtual reality systems. The need to store pretransformed display information in a database, traversing the database, extracting the appropriate data to generate the model from the selected point of view, and transforming it on the fly to the proper display format are all eliminated. As a result, the video display system of the present invention provides superior performance in displaying those view points stored in the frame buffer 42.

In accordance with various embodiments of the present invention, the organization of the frame buffer 42 can be modified to provide three dimensional video display. This is accomplished by providing "layers" or a three dimensional frame buffer. For example, the frame buffer 42 can be organized into a (16K×6K×10) pixel frame buffer. As the position sensor indicates the user is moving forward or backward, the various layers of the frame buffer 42 are accessed. As a result, the view window as seen through the head mounted display 22 appears to get bigger or smaller respectively.

The measuring step 92, which is implemented by the transmitter 26 and the receiver 28, can measure other movements besides the user's head. For example, the transmitter 26 can be attached to the users hand. In fact, it is within the scope of the present invention to measure any moving object.

The step 94 of calculating the view point, which is implemented by the position sensor 24, can be modified to provide three dimensional tracking. For example, the position sensor 24 can be modified to provide yaw, pitch and forward and backward tracking.

The computation step 96, which is implemented by the graphics processor 54, can be programmed to provide additional capabilities and flexibility to the video display system 10. In the embodiment described in relation to FIGS. 1–4 of the present application, the computational step provided a one-to-one correspondence. That is, for a one degree movement in either yaw or pitch, a similar one degree change of the view window 36 is realized (linear). The present invention, however, contemplates that the graphics processor 54 can be programmed to access the frame buffer 42 in accordance with any predefined algorithm. For example, with a one degree movement in either yaw or pitch, the graphics processor 54 can be programmed to access the information from the frame buffer 42 so that an N° (where N°=2, 3, 4...) change is reflected in the view window 36 (scaling). For a leftward shift in yaw, the image in the view window 36 may shift right, or vice versa. Similarly, an upward shift in the pitch may result in a downward shift in the view window 36, or vice versa. The graphics processor 54 can also be programmed to successively read out a plurality of view ports 34 from the frame buffer 42 (non-linear), thus creating a continuous "motion picture" image in the head mounted display 22. In summary, the graphics processor 54 can be programmed to compute any linear, scaled, non linear, or even a introduce a time delay in the access of information from the frame buffer 42.

The access step 98, which is implemented by the scan line generator 60 under the supervision of the graphics processor 54, is responsible for selecting and accessing the appropriate display information from frame buffer 42. The scan line generator 60 is extremely fast. It enables the view window to be updated with no perceptible lag time. The scan line generator 60 is also highly precise, and it allows the user to easily traverse the frame buffer.

It should be noted that the devices described in reference to FIGS. 1–4, including the measuring device, the device for defining a view point, the device for modifying the view point, the device for accessing display data, and the device for displaying the data are only exemplary. It is within the scope of the present invention to use any device to implement the above-mentioned functions. For example, a standard monitor could be used for the display device.

While the invention has been described in relationship to the embodiment shown in the accompanying figures, other embodiments, alternatives and modifications will be apparent to those skilled in the art. The video display system 10 can be used in any display environment, such as the office, video games, or flight simulators. The dimensions and size of the virtual view space 40, frame buffer 42 and view window 36 are all arbitrary. The system can be modified to provide a color video display system. This would require that the color pixel information be stored in the frame buffer 42. In a color video display system, the graphics processor 54 could be modified to perform a number of standard graphics related functions, such as shading, anti-aliasing, illumination, etc. The system could be modified to provide a selective transparent feature for the head mounted display. Lastly, the function keys of the keyboard 18 could be programmed to save and invoke a specific view window 36 in the virtual view space 40 when selected. It is intended that the specification be only exemplary, and that the true scope and spirit of the invention be indicated by the following claims.

What is claimed is:

1. The method of displaying information generated by a computer, comprising the steps of:
    storing information related to a multiplicity of view points of a model to be displayed in a frame buffer;
    selecting one of the view points based on an input from a user;
    accessing the information related to the selected one of the view points from the frame buffer;
    displaying the information related to the selected one of the view points on a display device;
    providing a virtual view space;
    mapping the information related to the multiplicity of view points of the model to be displayed and stored in the frame buffer to the virtual view space;
    mapping the entire virtual view space into the frame buffer;
    displaying the information related to the selected on of the view points in a view window within the virtual view space.

2. The method of claim 1, further comprising the step of converting the information related to the multiplicity of view points to a ready for display format prior to the storing step.

3. The method of claim 1, wherein the selection of one of the view points further comprises a step of measuring a movement of the user.

4. The method of claim 3, wherein the measuring step further comprises transmitting a position signal from the user to a receiver located at a fixed reference point.

5. The method of claim 4, wherein the position signal includes at least one of the following: yaw information; pitch information; or forward/backward information.

6. The method of claim 1, further comprising the step of modifying the selected view point according to a predefined algorithm prior to the access step.

7. The method of claim 6, wherein the modification is linear.

8. The method of claim 6, wherein the modification is non-linear.

9. The method of claim 6, wherein the modification is non-scaler.

10. The method of claim 6, wherein the modification includes a relationship between the time of selection of the selected view point and the time the selected view point is displayed.

11. The method of claim 1, further comprising the steps of:
- selecting a second of the view points based on a change of the input from the user;
- accessing the information related to the selected second view point from the frame buffer; and
- displaying the information related to the selected second view point on the display device.

12. The method of claim 1, wherein the access step further comprises:
- ascertaining a memory location in the frame buffer corresponding to the selected one of the view points;
- defining a view port around the corresponding memory location in the frame buffer;
- dividing the view port into a plurality of scan lines, each scan line including a fixed number of memory locations in the frame buffer; and
- for each scan line:
  - accessing a predetermined number of words from the frame buffer containing the scan line; and
  - truncating any of the memory locations from the accessed words falling outside the dimensions of the view port.

13. The method of claim 12, further comprising the steps of creating a view window in the display device from the plurality of truncated scan lines.

14. The method of claim 1, further comprising the step of generating scroll bars in the view window.

15. An apparatus for displaying a model generated by a computer, comprising:
- a frame buffer configured to store ready for display information related to a multiplicity of view points of a model to be displayed;
- an input device to select one of the view points;
- a graphics system, coupled to the input device, to access from the frame buffer a subset of the information related to the selected one of the view points;
- a display device, coupled to the graphics system, to display the subset of display information related to the selected one of the view points; and
- a virtual view space mapped into the frame buffer and a view window in the virtual view space to display the subset of display information related to the selected one of the view points.

16. The apparatus of claim 15, wherein the virtual view space is 360°.

17. The apparatus of claim 16, wherein the user is surrounded by the 360° virtual view space.

18. The apparatus of claim 15, wherein the input device is a position sensor which provides a position signal to the graphics system so that the graphics system can determine the selected one of the view points.

19. The apparatus of claim 18, wherein the position sensor further comprises a receiver at a fixed reference point and a transmitter coupled to a user to transmit user movement information to the receiver at the fixed reference point.

20. The apparatus of claim 15, wherein the display device is a head mounted display.

21. The apparatus of claim 15, wherein the graphics system further comprises a graphics processor to determine a memory location in the frame buffer corresponding to the selected one of the view points.

22. The apparatus of claim 21, wherein the graphics processor defines a view port around the selected memory location in the frame buffer.

23. The apparatus of claim 22, wherein the view port comprises a predetermined number of scan lines, each scan line including a fixed number of memory locations.

24. The apparatus of claim 23, further comprising a scan line generator, coupled to the graphics processor, to access the predetermined number of scan lines of the view port from the frame buffer.

25. The apparatus of claim 24, further comprising a truncator to truncate the memory locations of each scan line that falls outside of the view port.

26. The apparatus of claim 25, wherein the truncated scan lines for the view port are used by the display device to generate the view window in the virtual view space.

27. The apparatus of claim 15, wherein the graphics system further generates scroll bars in the view window.

28. The apparatus of claim 21, further comprising a display timing generator to provide a view window interrupt and a scan line interrupt to the graphics processor.

29. The apparatus of claim 15, further comprising an arbiter to arbitrate access to the frame buffer among the graphics processor, the scan line generator and the graphics processor.

* * * * *